(12) United States Patent
Ki et al.

(10) Patent No.: US 7,605,640 B2
(45) Date of Patent: Oct. 20, 2009

(54) N-STAGE EXPONENTIAL CHARGE PUMPS, CHARGING STAGES THEREFOR AND METHODS OF OPERATION THEREOF

(75) Inventors: Wing Hung Ki, Hong Kong (CN); Feng Su, Hong Kong (CN); Yat Hei Lam, Hong Kong (CN); Chi Ying Tsui, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 0 days.

(21) Appl. No.: 12/143,580

(22) Filed: Jun. 20, 2008

(65) Prior Publication Data

US 2008/0284499 A1    Nov. 20, 2008

Related U.S. Application Data

(63) Continuation of application No. 11/320,507, filed on Dec. 28, 2005, now Pat. No. 7,397,299.

(60) Provisional application No. 60/639,432, filed on Dec. 28, 2004.

(51) Int. Cl.
G05F 1/10 (2006.01)
(52) U.S. Cl. .................................................. 327/536
(58) Field of Classification Search ............... 327/535, 327/536, 537
See application file for complete search history.

(56) References Cited

U.S. PATENT DOCUMENTS

| 5,436,587 | A | | 7/1995 | Cernea |
| 5,444,362 | A | * | 8/1995 | Chung et al. ................ 323/313 |
| 5,801,577 | A | | 9/1998 | Tailliet |
| 5,877,948 | A | | 3/1999 | Dijkmans |
| 6,278,318 | B1 | | 8/2001 | Watanabe |
| 6,642,775 | B2 | | 11/2003 | Imamiya |
| 6,861,894 | B2 | | 3/2005 | Cernea |
| 6,922,096 | B2 | | 7/2005 | Cernea |
| 7,113,023 | B2 | | 9/2006 | Cernea |

OTHER PUBLICATIONS

Office Action, mailed Jul. 20, 2007 for U.S. Appl. No. 11/320,507.

* cited by examiner

*Primary Examiner*—Jeffrey S Zweizig
(74) *Attorney, Agent, or Firm*—Schwabe, Williamson & Wyatt, P.C.

(57) ABSTRACT

An exponential charge pump uses a number of identical or similar charging stages, each having a first and second capacitor. During a first clock phase, the first capacitor of each stage is charged by the second capacitor of the preceding stage, and, during a complementary second clock phase, the positive plate of the first capacitor of each stage is pushed to an increased voltage by the first capacitor of the preceding stage and charges the second capacitor of the next stage to the increased voltage at the same time. A similar mechanism occurs to the second capacitors in each stage, but with complementary timing. The increased voltage of the first capacitor of the last stage is pumped to an output capacitor during the second clock phase, and the increased voltage of the second capacitor of the last stage is pumped to an output capacitor during the first clock phase.

23 Claims, 4 Drawing Sheets

US 7,605,640 B2

N-STAGE EXPONENTIAL CHARGE PUMPS, CHARGING STAGES THEREFOR AND METHODS OF OPERATION THEREOF

This application is a continuation of U.S. application Ser. No. 11/320,507, filed Dec. 28, 2005 which claims priority to application No. 60/639,432, filed Dec. 28, 2004 entitled N-STAGE EXPONENTIAL CHARGE PUMPS, CHARGING STAGE THEREOF AND METHODS OF OPERATION THEREOF. Further, the specifications of application Ser. No. 11/320,507 and 60/639,432 are both hereby incorporated herein in their entirety. U.S. application Ser. No. 11/320,507 has issued as U.S. Pat. No. 7,397,299.

FIELD OF THE INVENTION

The present invention relates to switch capacitor power converters, also known as charge pumps. More particularly, the present invention relates to charge pumps which bear exponential increases in the output voltage with respect to the number of stages, herein called exponential charge pumps.

BACKGROUND OF THE INVENTION

A switch capacitor power converter, also known as a charge pump, is a circuit that converts a supply voltage $V_{dd}$ to an output voltage $V_o$, that provides power to a load using switches and capacitors. The switches are usually semiconductor switches such as diodes, NMOS (n-type metal oxide semiconductor) or PMOS (p-type metal oxide semiconductor) transistors. The conversion ratio M is defined as the ratio of the output voltage $V_o$ to the supply voltage $V_{dd}$, that is, $M=V_o/V_{dd}$. Charge pumps that have an output voltage $V_o$ higher than the supply voltage $V_{dd}$ are step-up charge pumps.

Step-up charge pumps have found applications in pacemakers where a high voltage is needed to stimulate the heart muscle using only a one-cell battery that has a low voltage. The high voltage may be 30V and the battery may have a voltage of 1.2V, giving a conversion ratio of M=25. They have also found applications in liquid crystal display drivers of handheld equipment. A liquid crystal display may need 20V to operate, but the handheld equipment is usually powered up by a battery of 3.6V. Hence, a step-up charge pump with a conversion ratio of 6 will be needed. In integrated circuit applications, an EEPROM may need a 12V supply voltage to perform programming and erasing of the programmable read only memory (PROM), but other circuits may use a 1V supply voltage. In this case, a single supply voltage of 1V can be used, and the voltage of 12V is generated by a charge pump with a conversion ratio of 12. To summarize, charge pumps with high conversion ratios are used in many practical applications.

Charge pumps of various different designs are well-known. Here, only a few popular designs that have earned industrial recognition are discussed. For easy comparison, a conversion ratio of M=16 with a supply voltage of $V_{dd}=2V$ is considered. The output voltage is then $V_o=32V$. In practice, the output voltage cannot reach 32V due to losses, but for the sake of this discussion, the charge transfers are assumed to be lossless.

Linear charge pumps that use diodes to charge the capacitors are popularly known as Dickson charge pumps. A linear charge pump has many stages N. For each stage, the corresponding capacitor is charged up to a voltage $V_{charge}$. The output voltage $V_o$ is the sum of N such voltages and the supply voltage $V_{dd}$, that is, $V_o=V_{dd}+NV_{charge}$. Linear charge pump are so called because the output voltage bears a linear relation with respect to $V_{charge}$. Dickson charge pumps use diodes as switches. A diode drop is 0.7V, and with a supply voltage of 2V, the useful voltage for charging the capacitors is only $V_{charge}=1.3V$. For an output voltage of 32V, a 24-stage linear charge pump is needed that requires 24 diodes and 25 capacitors, plus 4 large transistors for a 2-phase non-overlapping clock. A simple calculation shows that the efficiency of the charge pump is only 64% at best.

By replacing diodes with diode-connected NMOS transistors, the efficiency may be even worse, because the threshold voltage of an NMOS transistor may be larger than 0.7V, and body effects may result in an even larger threshold voltage. Researchers have tried different gate driving schemes, such that no voltage is dropped across the NMOS transistors that serve as switches. For such a scheme, additional circuitry is needed to open and close all the switches completely, and a 15-stage linear charge pump is still needed to achieve a conversion ratio of M=16, and 19 large transistors and 16 capacitors are needed, plus additional smaller transistors to drive the gates of the large transistors.

Another approach makes use of cross-coupled doublers. A cross-coupled doubler generates an output voltage of $2V_{dd}$ from a supply voltage of $V_{dd}$ using 3 capacitors and 8 switches. By cascading 4 such doubler stages, an output voltage of 32V can be obtained from a supply voltage of 2V. A total of 32 large transistors and 12 capacitors are used.

Existing charge pumps use many capacitors and switches to achieve a high conversion ratio. The large number of components required by the above three charge pumps are not favorable, and a more efficient scheme in reducing the number of components would be preferable.

SUMMARY OF THE INVENTION

The present invention provides a new type of charge pumps. The new pumps may have very high conversion ratios but use fewer switches and/or capacitors than existing designs.

The present invention is able to provide an N-stage charge pump that has an output voltage $V_o$ that is two to the power of N times of the supply voltage $V_{dd}$, that is, $V_o=2^N V_{dd}$. As this N-stage charge pump bears an exponential increase in the output voltage with respect to the number of stages, it is herein called an exponential charge pump.

According to one aspect of the invention, there is provided a charging stage of a first type for a charge pump. The charging stage includes: first and second inputs for first and second input voltages, respectively, first and second capacitors, first and second charging switches, first and second step-up switches, first and second grounding switches and first and second outputs for outputting first and second output voltages, respectively from the first and second capacitors. The first charging switch is connected between the second input and the second end of the first capacitor. The second charging switch is connected between the first input and the second end of the second capacitor. The first step-up switch is connected between the first input and the first end of the first capacitor. The second step-up switch is connected between the second input and the first end of the second capacitor. The first grounding switch is connected to the first end of the first capacitor for connecting the first end of the first capacitor to ground. The second grounding switch is connected to the first end of the second capacitor for connecting the first end of the second capacitor to ground.

The first charging switch is operable to charge the first capacitor using the second input voltage. The second charging switch is operable to charge the second capacitor using the first input voltage. The first step-up switch is operable to lift the voltage of the first capacitor using the first input voltage. The second step-up switch is operable to lift the voltage of the second capacitor using the second input voltage.

The invention also provides a charge pump comprising a plurality of such charging stages, in series.

According to another aspect of the invention, there is provided a charge pump having first and second branches, each of which has a plurality of capacitors and its own branch output. The first and second branches employ a push and pull charging and pumping mechanism, such that when the capacitors of the first branch are being charged up, the capacitors of the second branch are being stacked up to drive the output of the second branch. When the capacitors of the second branch are being charged up, the capacitors of the first branch are being stacked up to drive the output of the first branch.

According to again another aspect of the invention, there is provided a charging stage for a charge pump for receiving two input voltages and generating and outputting two output voltages. Each of the two output voltages is based on the addition of the first and second input voltages. The charge stage generates and outputs each output voltage using just one capacitor and three switches.

According to yet another aspect of the invention, there is provided a method of operating a charging stage of a charge pump, the charging stage having first and second capacitors, first and second input voltages and first and second output voltages. During a first clock phase: the first capacitor is charged using the second input voltage; the second branch capacitor is pushed up to a second increased voltage using the second input voltage; and the second increased voltage is output as the second output voltage. During a complementary second clock phase: the first branch capacitor is pushed up to a first increased voltage using the first input voltage; the first increased voltage is output as the first output voltage; and the second capacitor is charged using the first input voltage.

According to a further aspect of the invention, there is provided a method of operating a charge pump having a supply voltage, first and second branches and a plurality N charging stages, where $N \geq 3$. Each of a $k-1^{th}$ charging stage, a $k^{th}$ charging stage and a $k+1^{th}$ charging stage, $N>k>1$, has first and second branch capacitors. During a first clock phase, the first branch capacitor of the $k^{th}$ stage is charged to $2^{k-1}V_{dd}$ by the second branch capacitor of the $k-1^{th}$ stage. During a complementary second clock phase, the positive plate of the first branch capacitor of the $k^{th}$ stage is pushed by the first branch capacitor of the $k-1^{th}$ stage to $2^{k}V_{dd}$ and charges the second branch capacitor of the $k+1^{th}$ stage to $2^{k}V_{dd}$ at the same time.

In accordance with this and other objects of the present invention, an N-stage exponential charge pump is disclosed.

Such an exponential charge pump uses a number of identical or similar charging stages, each having a first capacitor and a second capacitor. During a first clock phase or timing, the first capacitor of each stage (except the first) is charged by the second capacitor of the preceding stage. During a complementary second clock phase or timing, the positive plate of the first capacitor of each stage (except the first) is pushed to an increased voltage by the first capacitor of the preceding stage to and charges the second capacitor of the next stage to the increased voltage at the same time. A similar mechanism occurs to the second capacitors in each stage (except the first), but with complementary timing.

This charge pump has a cross-coupled structure that employs a 2-phase non-overlapping clock with complementary phases $\Phi_1$ and $\Phi_2$. The cross-coupled structure uses two symmetrical branches of circuit, Branch A and Branch B. In $\Phi_1$="1" with "1" being a logic high, the $k^{th}$ capacitor of Branch A is charged to $2^{k-1}V_{dd}$ by the $k-1^{th}$ capacitor of Branch B. In $\Phi_2$="1", the positive plate of the $k^{th}$ capacitor of Branch A is pushed by the $k-1^{th}$ capacitor of Branch A to $2^{k}V_{dd}$ and charges the $k+1^{th}$ capacitor of Branch B to $2^{k}V_{dd}$ at the same time. A similar mechanism occurs to the capacitors in Branch B. That is, in $\Phi_1$="1", the $k^{th}$ capacitor of Branch B is charged to $2^{k-1}V_{dd}$ by the $k-1^{th}$ capacitor of Branch A, and then in $\Phi_2$="1", the positive plate of the $k^{th}$ capacitor of Branch B is pushed by the $k-1^{th}$ capacitor of Branch B to $2^{k}V_{dd}$ and charges the $k+1^{th}$ capacitor of Branch A to $2^{k}V_{dd}$ at the same time. This charging mechanism is the same for all stages, except that there is no Stage 0 to charge up the capacitors in Stage 1. Instead, the $1^{st}$ capacitor of Branch A is charged by the supply voltage $V_{dd}$ in $\Phi_1$="1", and the $1^{st}$ capacitor of Branch B is charged by the supply voltage $V_{dd}$ in $\Phi_2$="1". At the last stage of Stage N, the $N^{th}$ capacitor of Branch A charges the load capacitor $C_L$ in $\Phi_2$="1" to $2^{N}V_{dd}$ and the $N^{th}$ capacitor of Branch B charges the load capacitor $C_L$ in $\Phi_1$="1" to $2^{N}V_{dd}$, and hence, the output voltage $V_o$ is $2^{N}V_{dd}$.

For an exemplary embodiment of an N-stage charge pump of the present invention, each stage may have two capacitors and six switches, and the Output Stage consists of two switches and one capacitor $C_L$. Hence, the N-stage charge pump consists of 2N+1 capacitors and 6N+2 switches.

Exponential charge pumps according to the present invention are particularly advantageous if applied in electronic appliances, such as, but not limited to, having an integrated circuit that uses a low supply voltage for part of the circuit but a much higher voltage for another part of the circuit.

Further, additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

Figure 1:
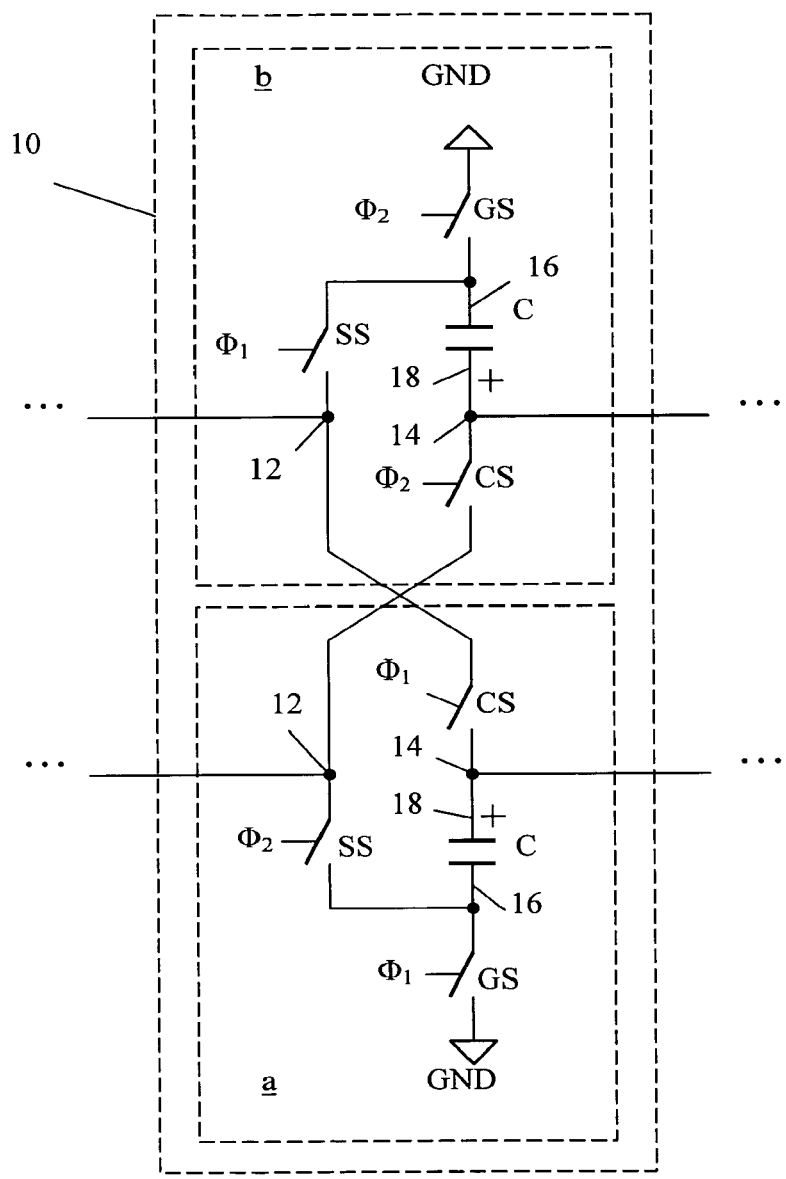
FIG. 1 is a schematic circuit diagram of one embodiment of a charge pump stage, in accordance with an aspect of the present invention.

An exemplary single charge pump stage 10, for use in a charge pump of the invention is shown in FIG. 1. The stage 10 has two branch portions a, b for use in different branches of a charge pump. The two branch portions a, b are structurally identical.

Each branch portion a, b has an input voltage node 12 and an output voltage node 14, three switches (a step-up switch SS, a charging switch CS and a grounding switch GS) and a capacitor C.

i. Within Each Branch Portion

A first end of the step-up switch SS is connected to the input voltage node 12. The step-up switch SS is connected between the input voltage node 12 and a first end 16 of the capacitor C, the smaller potential end, in this embodiment the negative plate end. The output node 14 is positioned between a first end of the charging switch CS and a second end 18 of the capacitor C, the larger potential end, in this embodiment the positive plate end. The grounding switch GS is provided between first end 16 of the capacitor C and a ground node GND.

Each switch is controlled to open and close according to a control signal for that switch. These control signals are provided according to two complementary clock phases $\Phi_1$ and $\Phi_2$. Where a switch is marked $\Phi_1$, it is open during clock phase $\Phi_1$ and closed during clock phase $\Phi_2$. Where a switch is marked $\Phi_2$, it is open during clock phase $\Phi_2$ and closed during clock phase $\Phi_1$. Thus the only difference between branch portions "a" and "b", is in the clock phases when the control signals open and close the various switches.

ii. Connections Between Branch Portions

For each branch portion, the second end of the charging switch CS is connected to the input voltage node 12 and first end of the step-up switch SS of the other branch portion of the stage.

Figure 2:
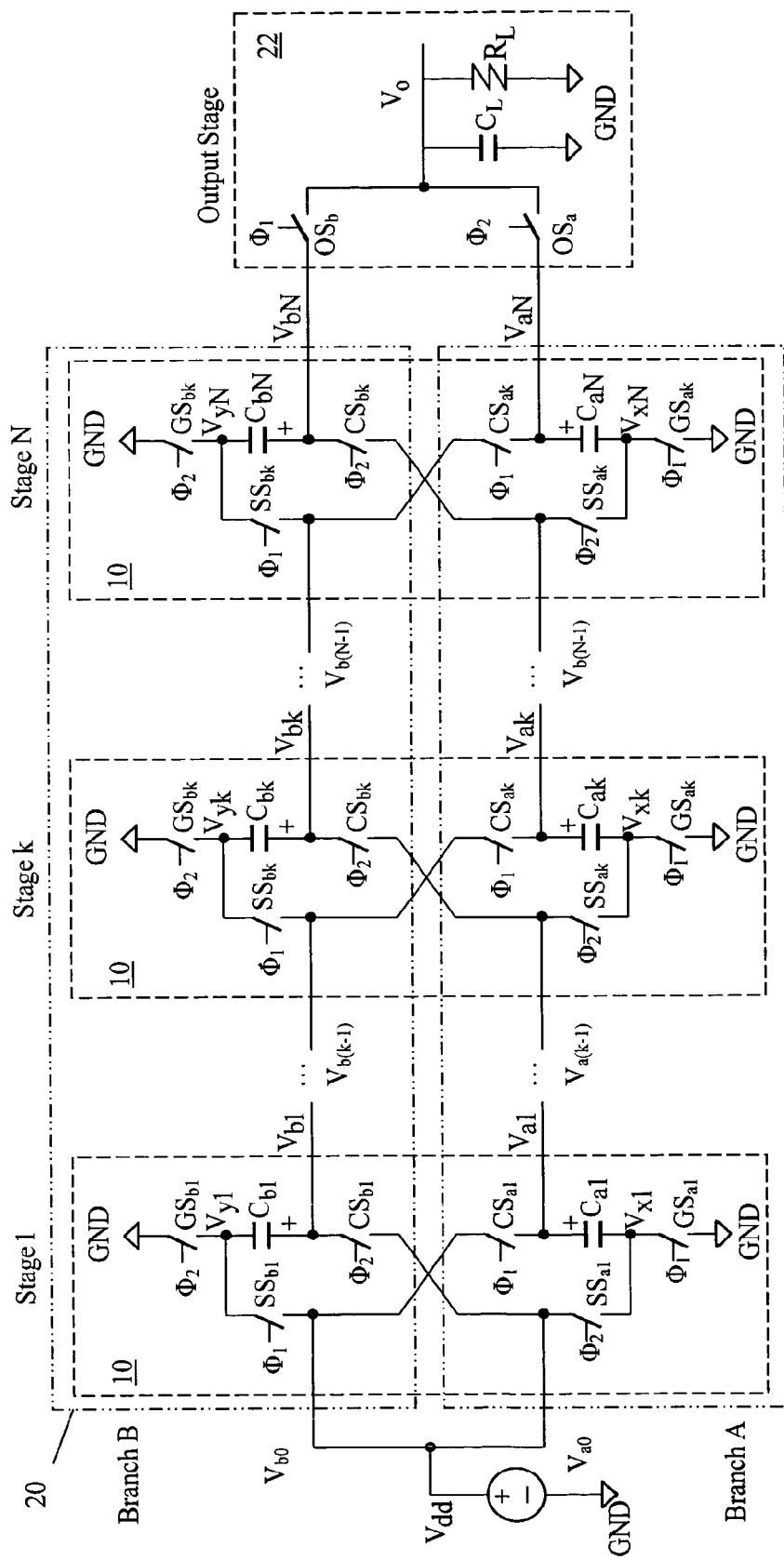
FIG. 2 is a schematic circuit diagram of a first exemplary embodiment of a charge pump, in accordance with an aspect of the present invention.

FIG. 2 is a schematic circuit diagram of an exemplary embodiment, being an N-stage exponential charge pump 20 with N charging stages (Stage 1, ..., Stage k, ..., Stage N) and an Output Stage 22.

This charge pump 20 of FIG. 2 can be described as a circuit with two symmetrical branches, Branch A and Branch B, that employ a push and pull charging and pumping mechanism, such that when the capacitors of one branch are being charged up, the capacitors of the other branch are being stacked up to drive the output node.

During a first clock phase, the $k^{th}$ stage capacitor of Branch A is charged to $2^{k-1}V_{dd}$ by the $k-1^{th}$ stage capacitor of Branch B (where $V_{dd}$ is the supply voltage). During a complementary second clock phase, the positive plate of the $k^{th}$ stage capacitor of Branch A is pushed by the $k-1^{th}$ stage capacitor of Branch A to $2^k V_{dd}$ and charges the $k+1^{th}$ stage capacitor of Branch B to $2^k V_{dd}$ at the same time. A similar mechanism occurs to the capacitors in Branch B, but with complementary timing. This charging mechanism is the same for all stages, except that there is no Stage 0 to charge up the capacitors in Stage 1. Instead, the capacitors of Stage 1 are charged by the supply voltage $V_{dd}$.

The N charging stages of the charge pump 20 of FIG. 2 are identical in this embodiment, each being as shown in FIG. 1. However the components of the different stages have additional identifiers to make them more easily distinguished for the purposes of this description. Each component is marked with an a or b subscript to indicate whether it is within portion a or portion b of the stage (thereby part of Branch A or B, respectively). Each component is further marked with a number or letter 1, k, N subscript to indicate in which stage it is.

Thus Stage 1 has a step-up switch $SS_{a1}$, a charging switch $CS_{a1}$, a grounding switch $GS_{a1}$, a capacitor $C_{a1}$, a step-up switch $SS_{b1}$, a charging switch $CS_{b1}$, a grounding switch $GS_{b1}$ and a capacitor $C_{b1}$. Stage k has a step-up switch $SS_{ak}$, a charging switch $CS_{ak}$, a grounding switch $GS_{ak}$, a capacitor $C_{ak}$, a step-up switch $SS_{bk}$, a charging switch $CS_{bk}$, a grounding switch $GS_{bk}$ and a capacitor $C_{bk}$. Stage N has a step-up switch $SS_{aN}$, a charging switch $CS_{aN}$, a grounding switch $GS_{aN}$, a capacitor $C_{aN}$, a step-up switch $SS_{bN}$, a charging switch $CS_{bN}$, a grounding switch $GS_{bN}$ and a capacitor $C_{bN}$.

Some voltages are also indicated at various points of the charge pump 20 of FIG. 2. The output voltage of each output node is indicated with an a or b subscript to indicate whether it is within portion a or portion b of the stage and with a number or letter 1, k, N subscript to indicate the current stage. The output voltage of Stage k−1 is the input voltage of Stage k for $1<k\leq N$. However, the voltages at the capacitor nodes, that is the first, negative ends of the capacitors are not marked a or b but x or y to indicate whether in portion a or b, respectively.

The two input voltages for Stage 1 are input voltage $V_{a0}$ and input voltage $V_{b0}$, which, in this embodiment are the same $V_{dd}$. The two output voltages for Stage 1 are output voltage $V_{a1}$ and output voltage $V_{b1}$. The two capacitor node voltages for Stage 1 are $V_{x1}$ and $V_{y1}$. The two input voltages for Stage k are input voltage $V_{a(k-1)}$ and input voltage $V_{b(k-1)}$. The two output voltages for Stage k are output voltage $V_{ak}$ and output voltage $V_{bk}$. The two capacitor node voltages for Stage k are $V_{xk}$ and $V_{yk}$. The two input voltages for Stage N are input voltage $V_{a(N-1)}$ and input voltage $V_{b(N-1)}$. The two output voltages for Stage N are output voltage $V_{aN}$ and output voltage $V_{bN}$. The two capacitor node voltages for Stage N are $V_{xN}$ and $V_{yN}$.

The control signals for the charging switch CS and the grounding switch GS of portion a of each stage and the control signal for the step-up switch SS of portion b of each stage are in the same first clock phase. The control signals for the charging switch CS and the grounding switch GS of portion b of each stage and the control signal for the step-up switch SS of portion a of each stage are in the same second clock phase.

The Output Stage 12 has two input voltage nodes $V_{aN}$ and $V_{bN}$, being the outputs of Stage N, one output voltage node $V_0$, a ground node GND, one load capacitor $C_L$, and two output switches $OS_a$ and $OS_b$, one for each Branch A, B, and their corresponding control signals $\Phi_2$ and $\Phi_1$, respectively.

Figure 3:
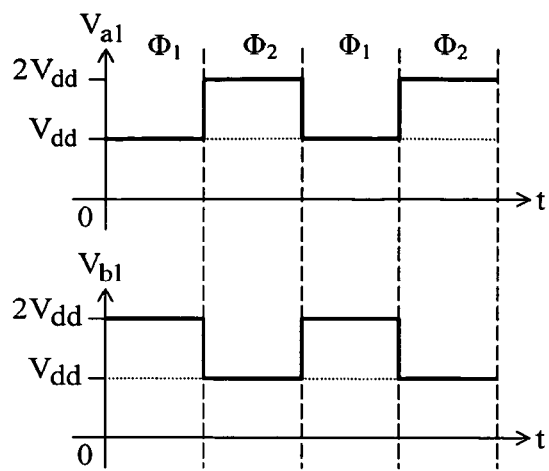
FIG. 3 depicts exemplary timing diagrams of Stage 1 of the embodiment of FIG. 2, in accordance with an aspect of the present invention.
Figure 4:
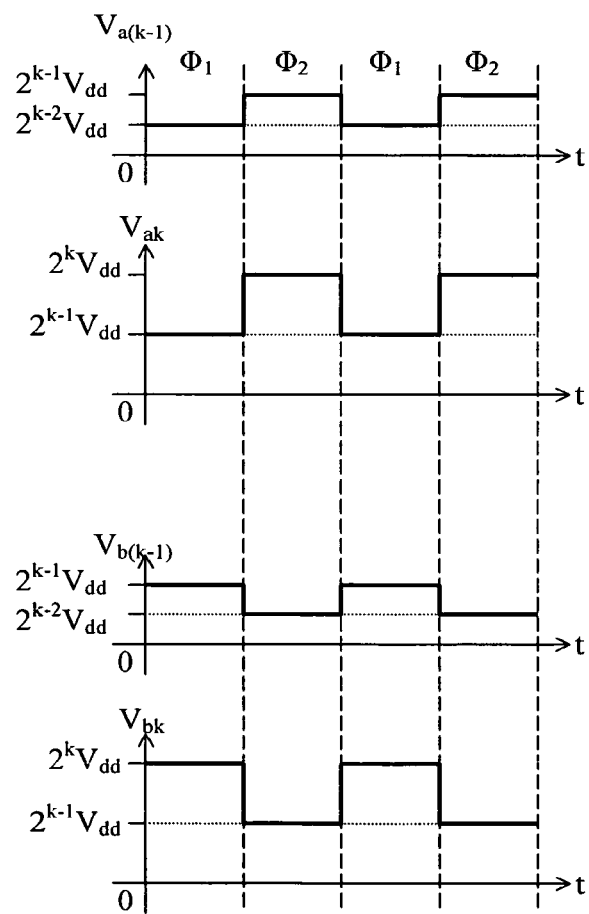
FIG. 4 depicts exemplary timing diagrams of Stage k of the embodiment of FIG. 2, in accordance with an aspect of the present invention.

By way of example, a timing diagram for Stage 1 is shown in FIG. 3, and a timing diagram for Stage k is shown in FIG. 4. FIG. 3 shows the output voltage levels of Stage 1 over time. FIG. 4 shows the input and output voltage levels of Stage k over time. Both FIGS. 3 and 4 show the steady state. In both FIGS. 3 and 4, the clock phase $\Phi_1$ means that all the first clock phase switch-closed switches (switches CS, GS of Branch A and switch SS of Branch B) are closed together and all the second clock phase switch-closed switches (switch SS of Branch A and switches CS, GS of Branch B) are open together. Clock phase $\Phi_2$ means that all the second clock phase switch-closed switches (switch SS of Branch A and switches CS, GS of Branch B) are closed together and all the second clock phase switch-closed switches (switches CS, GS of Branch A and switch SS of Branch B) are open together.

For the following description of the operation of the charge pump, it is assumed that the charge pump is operating in the steady state with no loss. That is, all charge transfers are lossless, and the load resistor $R_L$ is infinite.

For Stage 1, at $\Phi_1$="1", $C_{a1}$ is charged up to $V_{dd}$ through $CS_{a1}$ and $GS_{a1}$, and at $\Phi_2$="1", the negative plate of $C_{a1}$ is connected to $V_{dd}$ through $SS_{a1}$ and the voltage of the positive plate of $C_{a1}$ is then $2V_{dd}$. At the same time, $C_{a1}$ charges $C_{b2}$ through $CS_{b2}$ and $GS_{b2}$ to $2V_{dd}$. With alternate timings the same is happening with the other capacitor $C_{b1}$, such that $C_{b1}$ charges $C_{a2}$ through $CS_{a2}$ and $GS_{a2}$ to $2V_{dd}$. By operating $C_{a1}$ and $C_b$, alternately, their positive plates reach $2V_{dd}$ periodically, thus charging $C_{b2}$ and $C_{a2}$ with a voltage of $2V_{dd}$ across them.

For Stage k, at $\Phi_1$="1", $C_{ak}$ is charged up to $V_{b(k-1)}(\Phi_1) = 2^{k-1}V_{dd}$ through $CS_{ak}$ and $GS_{ak}$, and at $\Phi_2$="1", the negative plate of $C_{ak}$ is connected to $V_{a(k-1)}(\Phi_2) = 2^{k-1}V_{dd}$ through $SS_{ak}$ and the voltage of the positive plate of $C_{ak}$ is then $V_{ak}(\Phi_2) = 2^k V_{dd}$. At the same time, $C_{ak}$ charges $C_{b(k+1)}$ through $CS_{b(k+1)}$ and $GS_{b(k+1)}$ to $V_{ak}(\Phi_2) = 2^k V_{dd}$. With alternate timings the same is happening with the other capacitor $C_{bk}$, such that $C_{bk}$ charges $C_{a(k+1)}$ through $CS_{a(k+1)}$ and $GS_{a(k+1)}$ to $V_{ak}(\Phi_2) = 2^k V_{dd}$. By operating $C_{ak}$ and $C_{bk}$ alternately, their positive plates reach $2^k V_{dd}$ periodically, thus charging $C_{b(k+1)}$ and $C_{a(k+1)}$ with a voltage of $2^k V_{dd}$ across them.

Figure 5:
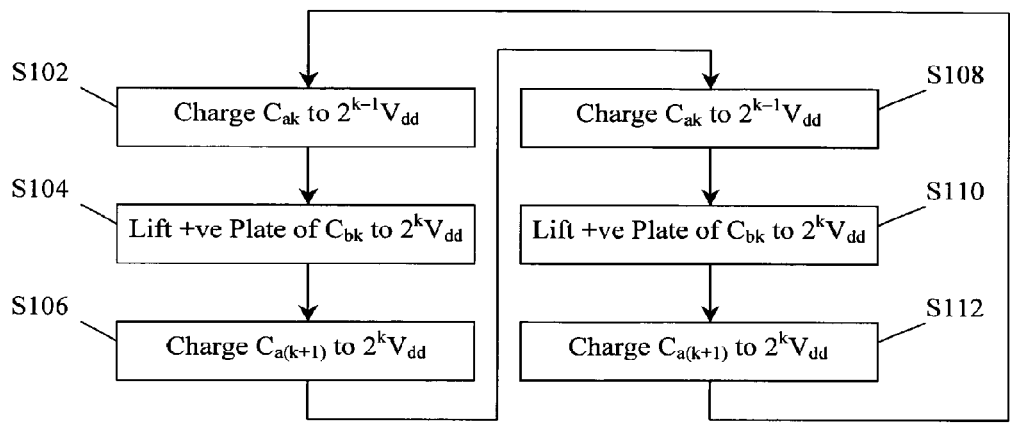
FIG. 5 is a flowchart of one operational embodiment of a stage in the embodiment of FIG. 2, in accordance with an aspect of the present invention.

FIG. 5 is a flowchart of one embodiment of Stage k in the embodiment of FIG. 2, in the steady state. At timing $\Phi_1$="1", $C_{ak}$ is charged up to $V_{b(k-1)} = 2^{k-1}V_{dd}$ (step S102), the positive plate of $C_{bk}$ is lifted to $V_{bk} = 2^k V_{dd}$ (step S104) and $C_{bk}$ charges $C_{a(k+1)}$ to $V_{bk} = 2^k V_{dd}$ (step S106). At timing $\Phi_2$="1", $C_{bk}$ is charged up to $V_{a(k-1)} = 2^{k-1}V_{dd}$ (step S108), the positive plate of $C_{ak}$ is lifted to $V_{ak} = 2^k V_{dd}$ (step S110) and $C_{ak}$ charges $C_{b(k+1)}$ to $V_{ak} = 2^k V_{dd}$ (step S112). This keeps on repeating.

For Stage N, at $\Phi_1$="1", $C_{aN}$ is charged up to $V_{b(N-1)}(\Phi_1) = 2^{N-1}V_{dd}$ through $CS_{aN}$ and $GS_{aN}$, and at $\Phi_2$="1", the negative plate of $C_{aN}$ is connected to $V_{a(N-1)}(\Phi_2) = 2^{N-1}V_{dd}$ through $SS_{aN}$ and the voltage of the positive plate of $C_{aN}$ is then $V_{aN}(\Phi_2) = 2^N V_{dd}$. At the same time, $C_{aN}$ charges $C_L$ through $OS_a$ to $V_o(\Phi_2) = 2^N V_{dd}$. With alternate timings the same is happening with the other capacitor $C_{bN}$, such that $C_{bN}$ charges $C_L$ through $OS_b$ also to $V_o(\Phi_2) = 2^N V_{dd}$. By operating $C_{aN}$ and $C_{bN}$ alternately, their positive plates reach $2^N V_{dd}$ periodically, thus charging $C_L$ with an output voltage of $V_o = 2^N V_{dd}$.

In effect, each output voltage of each stage is an addition result of the two input voltages to that stage.

With a four-stage, 16× charge pump of the present invention, an input of 100-200 mV ideally has an output of 1.6-3.2 V. However, in practice, a test circuit constructed according to the concepts of the invention, with four charging stages was able to produce from 1.12-2.31 V from a supply voltage of 80-200 mV.

Figure 6:
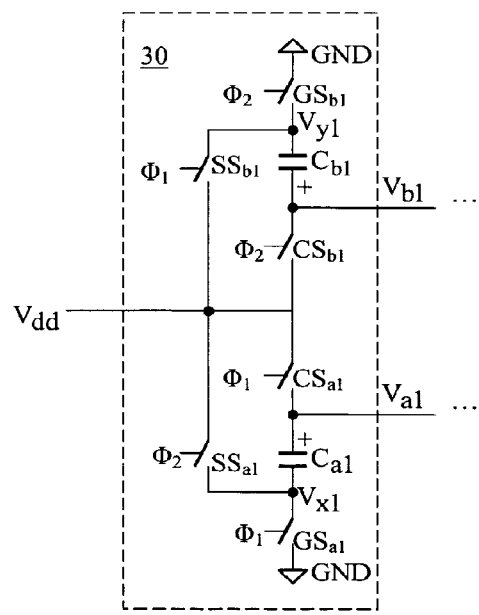
FIG. 6 is an alternative Stage 1 embodiment to that used in the embodiment of FIG. 2, in accordance with an aspect of the present invention.

FIG. 6 shows an alternative Stage 130, where the inputs are slightly different from that shown in FIG. 2. Electrically they are the same but there is only one input into the stage, which connects with the first ends of the two step-up switches $SS_{al}$, and $SS_{bl}$, and the two charging switches $CS_{al}$, and $CS_{bl}$.

In the above described embodiment of FIGS. 1 and 2, the input voltage to one branch portion of a stage is used to charge the capacitor of the other portion. In an alternative embodiment, the input voltage to one branch portion of a stage is used to charge the capacitor of the same branch portion of the stage, and the capacitor voltage of that branch portion is lifted using the input voltage of the other branch portion.

The switches of the exemplary stages and charge pumps are typically implemented by NMOS transistors or PMOS transistors. If a switch is implemented by an NMOS transistor, then the gate voltage of that switch is high when the relevant control signal is high. On the other hand, if a switch is implemented by a PMOS transistor, then the gate voltage of that switch is low when the relevant control signal is high. However, this would not change the notation used in the Figures as that indicates when a switch is closed (whether the control signal itself is high or low). Thus the control pump could operate with just a single clock signal if all the first clock phase-closed switches were of a same first type (e.g. NMOS) and all the second clock phase-closed switches were of a same second type (e.g. PMOS) that operated in a complementary manner to those of the first type. In the preferred embodiment, the grounding switches of the charging stages are NMOS, whilst most of the rest are PMOS.

Persons skilled in the art will appreciate that other switches and their corresponding clock phases may be defined in a similar fashion.

Additionally, the high voltage of a Stage p may be different from the high voltage of a Stage q, and the low voltage of Stage p may be different from the low voltage of Stage q, with $1 \leq p, q \leq N$ and $p \neq q$, but persons skilled in the art will determine the appropriate high and low voltages of each stage such that the corresponding switches can be turned on and off completely.

The invention as embodied is for use with a positive or negative power supply. With a negative power supply the second end of each capacitor is more negative and is the negative plate, which is pushed more negative from stage to stage.

In the above description the grounding switches are connected to ground. However they could connect to some other base level, to draw off charge, as necessary. The base level does not even need to be constant, but may alternate or otherwise vary over time. With a non-ground base level, the conversion ratio would no longer be $2^N \times V_{dd}$.

To summarize the above-provided description, an exponential charge pump uses a number of identical or similar charging stages, each having a first capacitor and a second capacitor. During a first clock phase, the first capacitor of each stage (except the first stage) is charged by the second capacitor of the preceding stage and the first capacitor of the first stage is charged by a power supply. During a complementary second clock phase, the positive plate of the first capacitor of each stage (except the first stage) is pushed to an increased voltage by the first capacitor of the preceding stage and charges the second capacitor of the next stage to the increased voltage at the same time. The positive plate of the first capacitor of the first stage is also pushed to an increased voltage, by the power supply and charges the second capacitor of the second stage to the increased voltage at the same time. A similar mechanism occurs to the second capacitors in each stage, but with complementary timing. The increased voltage of the first capacitor of the last stage is pumped to an output capacitor during the second clock phase, and the increased voltage of the second capacitor of the last stage is pumped to an output capacitor during the first clock phase. As a result, the charge pump bears an exponential increase in the output voltage with respect to the number of the stages.

Persons skilled in the art will appreciate also that the present invention can be practiced by other than the described embodiments, within the same spirit and scope. The described embodiments are presented for purposes of illustrations and not of limitation, and the present invention is limited only by the claims that follow.

What is claimed is:

1. A charge pump, comprising:
   a plurality of charging stages, wherein each of the charging stages includes:
   a first input node, a first capacitor having a first end and a second end, a first charging switch, a first step-up switch, a first grounding switch, and a first output node configured to output a first output voltage from the first capacitor; and
   a second input node, a second capacitor having a third end and a fourth end, a second charging switch, a second step-up switch, a second grounding switch, and a second output node configured to output a second output voltage from the second capacitor,
wherein:
the first charging switch is coupled to the second input node and to the second end of the first capacitor;
the second charging switch is coupled to the first input node and to the fourth end of the second capacitor;
the first step-up switch is coupled to the first input node and to the first end of the first capacitor;
the second step-up switch is coupled to the second input node and to the third end of the second capacitor;
the first grounding switch is coupled to the first end of the first capacitor and is configured to couple the first end of the first capacitor to a base level;
the second grounding switch is coupled to the third end of the second capacitor and is configured to couple the third end of the second capacitor to the base level;
the first set-up switch, the second charging switch, and the second grounding switch are configured to operate responsive to a first edge of each clock pulse of a clock signal; and
the first charging switch, the first grounding switch, and the second set-up switch are configured to operate responsive to a second edge of each clock pulse of the clock signal, wherein the first and second edges are different edges of each clock pulse.

2. The charge pump of claim 1, further comprising a clock-generation circuit coupled to the charging stages and configured to generate the clock signal.

3. The charge pump of claim 1, wherein the base level is ground.

4. The charge pump of claim 1, further comprising a supply voltage source coupled to the first charging stage.

5. The charge pump of claim 1, wherein:
the first set-up switch, the second charging switch, and the second grounding switch each comprise a first transistor type;
the first charging switch, the first grounding switch, and the second set-up switch each comprise a second transistor type, different from the first transistor type; and
the first transistor type and the second transistor type are selected from a group consisting of an NMOS transistor and a PMOS transistors.

6. The charge pump of claim 1, further comprising an output stage positioned after a last of the charging stages, wherein the output stage includes:
a first output switch coupled to the first output node of the last charging stage and to a fifth end of a load capacitor;
a second output switch coupled to the second output node of the last charging stage and to the fifth end of the load capacitor;
the load capacitor comprising the fifth end, wherein the fifth end is coupled to the first output switch and to the second output switchs, and wherein the load capacitor further comprises a sixth end coupled to the base level; and
third output node coupled with the load capacitor to output voltage from the load capacitor.

7. The charge pump of claim 1, wherein the first edge is a rising edge and the second edge is a falling edge.

8. The charge pump of claim 1, wherein the first edge is a falling edge and the second edge is a rising edge.

9. A method, comprising:
providing a first input voltage and a second input voltage to each charging stage of a plurality of charging stages coupled in series, wherein each charging stage includes a first charging switch and a second charging switch, a first set-up switch and a second set-up switch, a first grounding switch and a second grounding switch, and a first capacitor and a second capacitor;
providing a clock signal, wherein the first set-up switch, the second charging switch, and the second grounding switch are configured to be controlled by an edge of the clock signal, and wherein the first charging switch, the first grounding switch and the second set-up switch are configured to be controlled by an opposing edge of the clock signal;
receiving a first output voltage from the first capacitor; and
receiving a second output voltage from the second capacitor.

10. The method of claim 9, further comprising:
charging the first capacitor of a first charging stage from the plurality of charging stages through the first charging switch using the second input voltage;
charging the second capacitor of the first charging stage from the plurality of charging stages through the second charging switch using the first input voltage;
lifting the voltage of the first capacitor of the first charging stage from the plurality of charging stages through the first step-up switch using the first input voltage; and
lifting the voltage of the second capacitor of the first charging stage from the plurality of charging stages through the second step-up switch using the second input voltage.

11. The method of claim 10, further comprising:
providing the first output voltage from a preceding charging stage as the first input voltage; and
providing the second output voltage from the preceding charging stage as the second input voltage.

12. The method of claim 10, further comprising:
providing a supply voltage source as the first and second input voltages of a first charging stage of the plurality;
providing the first output voltage from the last charging stage to a load capacitor through a first output switch, wherein the load capacitor and the first output switch include part of an output stage coupled to a last one of the charging stages;
providing the second output voltage from the last charging stage to the load capacitor through a second output switch of the output stage; and
receiving a voltage from the load capacitor.

13. An apparatus, comprising:
a power supply to supply a supply voltage; and
a charge pump coupled to the supply voltage, wherein the charge pump comprises a plurality of charging stages, and wherein each of the charging stages comprises:
a first input node, a first capacitor having a first end and a second end, a first charging switch, a first step-up switch, a first grounding switch, and a first output node configured to output a first output voltage from the first capacitor; and
a second input node, a second capacitor having a third end and a fourth end, a second charging switch, a second step-up switch, a second grounding switch, and a second output node configured to output a second output voltage from the second capacitor,
wherein:
the first charging switch is coupled to the second input node and to the second end of the first capacitor;

the second charging switch is coupled to the first input node and to the fourth end of the second capacitor;
the first step-up switch is coupled to the first input node and to the first end of the first capacitor;
the second step-up switch is coupled to the second input node and to the third end of the second capacitor;
the first grounding switch is coupled to the first end of the first capacitor and is configured to couple the first end of the first capacitor to a base level;
the second grounding switch is coupled to the third end of the second capacitor and is configured to couple the third end of the second capacitor to the base level;
the first set-up switch, the second charging switch, and the second grounding switch are configured to operate responsive to an edge each clock pulse of a clock signal; and
the first charging switch, the first grounding switch, and the second set-up switch are configured to operate responsive to an opposing edge of each clock pulse of the clock signal; and
an output stage coupled to the charge pump and configured to accept the first output voltage from a last charging stage of the plurality of stages and a second output voltage from the last charging stage of the plurality of stages, wherein the output stage is further configured to combine the accepted first output voltage and the accepted second output voltage into a combined output voltage, and wherein the output stage is further configured to output the combined output voltage.

14. The apparatus of claim 13, wherein the output stage comprises:
a first output switch coupled to the first output node from the last charging stage and to a fifth end of a load capacitor;
a second output switch coupled to the second output node from the last charging stage and to the fifth end of the load capacitor;
the load capacitor including the fifth end, wherein the fifth end is coupled to the first and second output switches, and wherein the load capacitor further includes a sixth end coupled to the base level; and
a third output node coupled to the load capacitor and configured to output a voltage from the load capacitor.

15. The apparatus of claim 13, wherein the first set-up switch, the second charging switch, and the second grounding switch each comprise a first transistor type;
wherein the first charging switch, the first grounding switch, and the second set-up switch each comprise a second transistor type, different from the first transistor type; and
wherein the first transistor type and the second transistor type are selected from a group consisting of an NMOS transistor and a PMOS transistors.

16. The apparatus of claim 13, wherein the supply voltage comprises a battery.

17. The apparatus of claim 13, wherein the apparatus further comprises a liquid crystal display (LCD) coupled to the output stage and configured to accept the combined output voltage.

18. The apparatus of claim 13, wherein the apparatus further comprises an Electrically Erasable Programmable Read-Only Memory (EEPROM) coupled to the output stage and configured to accept the combined output voltage.

19. The apparatus of claim 13, wherein the apparatus further comprises a pacemaker.

20. An apparatus, comprising:
a power supply configured to supply a supply voltage; and
a charge pump coupled to the power supply, wherein the charge pump comprises a plurality of charging stages, and wherein each of the charging stages comprises:
a first input node, a first capacitor having a first end and a second end, a first charging switch, a first step-up switch, a first grounding switch, and a first output node configured to output a first output voltage from the first capacitor; and
a second input node, a second capacitor having a third end and a fourth end, a second charging switch, a second step-up switch, a second grounding switch, and a second output node configured to output a second output voltage from the second capacitor, wherein:
the first set-up switch, the second charging switch, and the second grounding switch are configured to operate responsive to an edge of each clock pulse of a clock signal; and
the first charging switch, the first grounding switch, and the second set-up switch are configured to operate responsive to an opposing edge of each clock pulse of the clock signal; and
an output stage coupled to the charge pump and configured to accept the first output voltage from a last charging stage of the plurality of stages and a second output voltage from the last charging stage of the plurality of stages, wherein the output stage is further configured to combine the accepted first output voltage and the accepted second output voltage into a combined output voltage, and wherein the output stage is further configured to output the combined output voltage.

21. The apparatus of claim 20, wherein the output stage comprises:
a first output switch coupled to the first output node from the last charging stage and to a fifth end of a load capacitor;
a second output switch coupled to the second output node from the last charging stage and to the fifth end of the load capacitor;
the load capacitor including the fifth end, wherein the fifth end is coupled to the first and second output switches, and wherein the load capacitor further includes a sixth end coupled to the base level; and
a third output node coupled to the load capacitor and configured to output voltage from the load capacitor.

22. The apparatus of claim 20, wherein:
the first set-up switch, the second charging switch, and the second grounding switch each comprise a first transistor type;
the first charging switch, the first grounding switch, and the second set-up switch each comprise a second transistor type, different from the first transistor type; and
the first transistor type and the second transistor type are selected from a group consisting of an NMOS transistor and a PMOS transistors.

23. The apparatus of claim 20, wherein the apparatus further comprises a selected one of a liquid crystal display (LCD) or an Electrically Erasable Programmable Read-Only Memory (EEPROM) coupled to the output stage.

* * * * *